March 17, 1953 W. E. KOCK 2,632,146

TRANSISTOR FREQUENCY MODULATION

Filed Jan. 13, 1949

INVENTOR
W. E. KOCK
BY Harry C. Hart
ATTORNEY

Patented Mar. 17, 1953 2,632,146

UNITED STATES PATENT OFFICE 2,632,146

TRANSISTOR FREQUENCY MODULATION

Winston E. Kock, Basking Ridge, N. J., assignor to Bell Telephone Laboratories, Incorporated, New York, N. Y., a corporation of New York Application January 13, 1949, Serial No. 70,635

17 Claims. (Cl. 332—9)

This invention relates to phase and frequency modulation and has for its principal object to modulate the frequency of a wave train in a novel manner.

A more general object is to modulate the phases of successive waves of a train in a novel manner.

Another object is to generate a train of waves of frequency amplitude and of controllably variable frequency.

Still another object is to provide a pulse generator of the recirculation type in which the functions of amplification and time delay are performed by one and the same element.

The invention utilizes as its central element a semi-conductor amplifier. In its original form as described in an abandoned application of John Bardeen and Walter H. Brattain, Serial No. 11,165, filed February 26, 1948, now superseded by a continuation-in-part application of the same inventors, Serial No. 33,466, filed June 17, 1948, and issued October 3, 1950, as Patent 2,524,-035, the device, which has since come to be known as a "transistor," comprises a small block of semiconductor material such as germanium having at least three electrodes coupled thereto, termed the emitter, the collector and the base electrode. The emitter and the collector may be point-contact electrodes making rectifier contact with one face of the block and very close together, while the base electrode may be a plated metal film providing a low resistance contact. The emitter may be biased for conduction in the forward direction, while the collector is preferably biased for conduction in the reverse direction. Application of an electrical disturbance, for example a signal, to the emitter electrode modifies the distribution of the mobile charges in the interior of the semiconductor block. These mobile charges move within the block, and there appears in a load circuit, connected to the collector, an output signal which is an amplified version of the voltage, current and power or the input signal. It appears with no substantial delay. Indeed, the output current and voltage have been found to be in phase with the input current and voltage even at frequencies which are well up in the megacycle range.

In an application of J. R. Haynes and W. Shockley, Serial No. 50,894, filed September 24, 1948 which issued on June 17, 1952 as Patent No. 2,600,500, there is described a modified transistor which departs from its prototype in three major regards. First, the spacing, along the semiconductor block surface, between the emitter and collector have been greatly increased. This results in a substantial time delay between the application of a disturbance to emitter and the appearance of a corresponding disturbance at the collector. This delay is due to the fact that the velocities of movement of the mobile charges or current carriers within the semiconductor material are restricted, so that a substantially greater transit time is required for their migration over the increased distance. Second, the block itself is elongated and narrowed into the form of a thin filament to constrain the mobile charges to substantially rectilinear paths of lengths sufficient to provide substantial transit times. Third, instead of a single base electrode plated over the opposite face of the block, two electrodes are provided, which make low resistance contact with the ends of the filament, one at the emitter end and the other at the collector end. When a difference of potential is applied between these end electrodes, an electric field is established longitudinally of the filament. It is this field which guides or entrains the mobile charges originating at the emitter to the collector. In its absence they would flow away from the emitter in both directions.

In one of its aspects, the present invention is based upon the realization that, by a controlled variation of the end electrode voltage, and so of the charge migration speed and time of transit from the emitter to the collector, a regularly recurring sequence of disturbances applied to the emitter gives rise to a corresponding sequence of disturbances at the collector whose phases, however, are modulated in accordance with the end electrode potential variation.

In another aspect, the present invention is based upon the realization that each collector output disturbance of controllable phase may be fed back to the emitter as an input disturbance, there to be propagated once more, at controlled speed, to the collector, fed back again, and so on. In other words, the four-electrode filamentary semiconductor amplifier of the aforementioned Haynes-Shockley application lends itself easily and conveniently to incorporation in a pulse recycling or delayed feedback amplifier, where it performs both of the essential functions of such a system, namely, to provide amplification and to provide time delay. Inasmuch as the generated frequency of such a system is simply the rate at which the disturbance recurs at suitably located output terminals, and this rate is the reciprocal of the time delay around the feedback loop, the invention provides a simple and reliable generator of controllably variable frequency.

In a third aspect, which combines the two foregoing aspects, the invention provides for the modulation, by an input signal derived, for example, from a microphone or other signal source, of the frequency of a train of waves which are generated by the delayed recirculation of an original disturbance such as a voltage pulse applied to the emitter electrode.

Still other aspects and features of the invention will be apprehended from the following detailed description of illustrative embodiments thereof, taken in connection with the appended drawings, in which.

Figure 1:
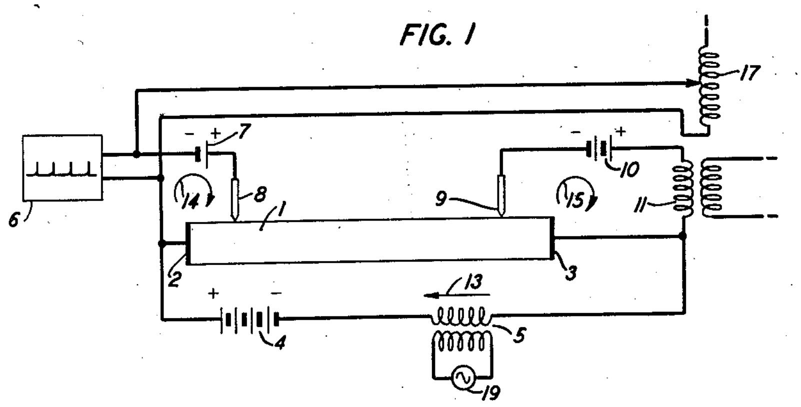
Fig. 1 is a schematic diagram of a phase-modulator embodying the invention.

Referring now to the drawings, Fig. 1 shows in diagrammatic form a narrowed and elongated body 1 of semiconductive material such, for example, as N-type germanium having low resistance ohmic connections or terminals 2, 3 at its opposite ends. These connections may be, for example, coatings, such as rhodium, electroplated upon the body to form non-rectifying junctions therewith. Connected between the terminals is a direct current source such as a battery 4 in series with one winding of a transformer 5 or other voltage varying device. This battery and transformer provide a means for establishing within the body a longitudinal field, the strength of which can be controllably varied. The output of a recurrent voltage pulse generator 6 is connected through a source of biasing voltage, such as a battery 7 between one terminal 2 of the semiconductor body 1 and a contact point 8 for example of tungsten or phosphor bronze, which engages the body 1 near one end. A second similar contact point 9 engages the body at a region removed from the first contact point, near the other end of the body. It is connected through a biasing means such as a battery 10 and a loading transformer winding 11 to the second terminal 3. The impedance of the load may be either resistive or inductive.

If the body is of N-type material, for example high back voltage germanium, the polarities of the bias sources 4, 7, 10 are as shown in Fig. 1 and the contact point 8 and the terminal 2 associated with the pulse voltage generator become the emitter and base respectively, and the second contact point 9 becomes the collector. Specifically, the terminal 2 is connected to the positive side of the source 4, the emitter 8 is biased sufficiently positive with respect to the terminal 2 so that a positive current flows from the emitter into the body 1, and the collector 9 is biased negatively with respect to the terminal 3. The direction of current flow in the external circuits is as shown by the arrows 13, 14, 15 in the emitter and collector circuits in Fig. 1. If the body 1 is of P-type material, the polarities of the sources 4, 7, 10 should be reversed. In general, the bias upon the emitter should be small, for example of the order of 0.1 volt, and the bias on the collector should be relatively large, for example of the order of 10 to 100 volts.

The operation of the device is as follows: in the absence of any voltage from the pulse generator 6 or from the transformer 5, there is within the body 1 between the emitter 8 and collector 9 a current which is made up of two parts, the normal electron current established by the voltage source 4 and the flow of positive carriers which are injected into the body by the emitter 8 and flow along the body to the collector 9. There results a constant current through the transformer winding 11. If now the pulse voltage generator 6 is made operative and causes, for example, a series of positive voltage pulses to be applied to the emitter 8, there results a corresponding series of voltage peaks travelling between the emitter 8 and the collector 9 with a speed substantially equal to that of light. Also, as each positive voltage peak is impressed on the emitter, a group of positive carriers is injected into the body at the emitter. These carriers travel along the body to the collector with a speed controlled by the longitudinal electric fields; i. e., by the length of the body between the electrodes 8, 9 and by the strength of the bias source 4. The time of transit of such carriers from the emitter to the collector is determined by this field and by the spacing between the emitter and the collector. Thus the output signal comprises two components, one associated with the voltage drop between the collector and the terminal 3 and appearing substantially instantaneously with the application of the input voltage peaks, and the other associated with the modulation of the collector current by the positive charge carriers and delayed with respect to the input voltage peaks. The output voltage which is associated with the first component can, if desired, be balanced out by any convenient means as, for example, by employing for the load impedance a transformer having an adjustable third winding 17 which is connected to the pulse source 6. This leaves in the output circuit only the second component, which is a delayed replica of the input voltage pulses. If the accelerating voltage is caused to vary, as by application of a signal of a source 19 to the primary winding of transformer 5, the speed of travel of the positive carriers travelling along the body 1 between the emitter 8 and the collector 9 is modulated, and the output voltage becomes a phase-modulated version of the input signal of the source 19.

Figure 2:
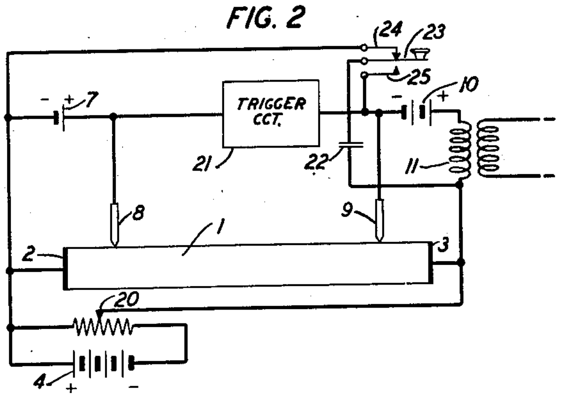
Fig. 2 is a schematic diagram of a variable frequency pulse generator embodying the invention.

Fig. 2 shows a pulse-recycling device in which the transit time of the positive charge carriers along the body 1 between the emitter 8 and the collector 9 is utilized to control the frequency of a recurrent pulse generator. The accelerating voltage is made adjustable as by a potentiometer 20 across the voltage supply source 4. A pulse generator 21 or trigger circuit of appropriate type is connected between the collector 9 and the emitter 8. The trigger circuit 21 has the characteristic that if a voltage pulse, as for example a positive pulse, is impressed on its input terminals an amplified version of the pulse is released at its output terminals. Trigger circuits having these characteristics are well known in the art, and are described, inter alia, in "Time Bases" by O. S. Puckle (Wiley 1946) page 59, and by Kieburt and Inglis in the Proceedings of the Institute of Radio Engineers, volume 33, page 534 (1945). If now an initial positive voltage is impressed on the input terminals of the trigger circuit 21 by any means, the triggered pulse at the output terminals is impressed on the emitter 8 and a group of positive charge carriers is injected into the body 1. This group of carriers moves along the body to the collector 9 in a time determined by the distance between the emitter 8 and the collector 9, and the strength of the accelerating field. Upon arriving at the collector 9, the charge is picked up and fires the trigger circuit 21, causing another group of carriers to be injected into the body 1 at the emitter 8. This group in turn travels to the collector 9 and again fires the trigger circuit 21. This process continues, giving across the output transformer 11 a sequence of voltage pulses the repetition rate of which is the reciprocal of the time charge transit along the body 1 and around the feedback loop. This frequency can be controlled either by adjustment of the spacing between the collector 9 and the emitter 8 or by adjustment of the accelerating voltage, e. g., the setting of the potentiometer 20, or both.

An initiating pulse is required to set the system in operation. This may easily be provided by the discharge of a condenser into the input terminals of the trigger circuit 21. Thus a condenser 22 may be connected across the terminals of the accelerating voltage source 10, its circuit being completed by way of a movable key 23 which normally engages a fixed contact 24. Another fixed contact 25 is connected to the input terminals of the trigger circuit. The condenser is thus normally charged to the full voltage of the bias source 10. Depressing the key 23 opens the circuit at the first fixed contact 24 and closes it at the second 25, thereby applying the voltage of the condenser 22 to the input terminals of the trigger circuit 21, where it serves as a starting pulse.

The undelayed voltage peaks may, if desired, be balanced out as suggested in the case of Fig. 1, but this is unnecessary because they are not effective in actuating the trigger circuit.

Figure 3:
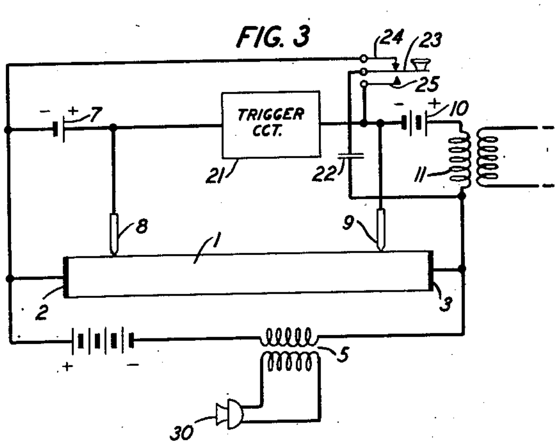
Fig. 3 is a schematic diagram of a system by which the frequency of the pulses generated by the system of Fig. 2 may be modulated by a signal.

Fig. 3 shows a variant of the recurrent pulse generator of Fig. 2 in which the accelerating field, and therefore the output pulse recurrence rate, are modulated in the manner described in connection with Fig. 1, as by the signal of a microphone 30 applied to the primary winding of the transformer 5. The output across the transformer 11 is a sequence of pulses whose repetition rate or frequency is modulated in accordance with the microphone input. The arrangements described above are illustrative of the application of the principles of the invention. Numerous other arrangements may be devised by those skilled in the art which fall within its scope, as defined by the claims, without departing from its spirit.

What is claimed is:

1. Apparatus which comprises an elongated body of semiconductive material, a first circuit including means for injecting charges into said body at one region adjacent one end thereof, a second circuit including a connection to said body at another region adjacent the other end thereof for withdrawing charges from said body, a source of potential and of potential variations, means including said source for establishing an electric field longitudinally of said body between said regions to determine the transit time of charges from said one region to said other region, and means under control of said source for varying said field, thereby to vary said transit time.

2. Apparatus which comprises an elongated body of semiconductive material, a first circuit including means for injecting charges of one polarity into said body at one region adjacent one end thereof, a second circuit including a connection to said body at another region adjacent the other end thereof, means for biasing said connection at a polarity opposite to that of said charges, means for establishing an electric field longitudinally of said body between said regions to determine the transit time of charges from said one region to said other region, a signal source, and means under control of the signals of said source for varying said field, thereby to vary said transit time.

3. Phase-modulation apparatus which comprises an elongated body of semiconductive material, means for injecting charges of one polarity into said body at one region adjacent one end thereof, a circuit including a connection to said body at another region adjacent the other end thereof for withdrawing charges from said body, means for biasing said connection at a polarity opposite to that of said charges, a source of periodic waves of charge connected to said injecting means, means for establishing an electric field longitudinally of said body between said regions to determine the transit time of charges from said one region to said other region, a signal source, and means under control of the signals of said source for varying said field, thereby to vary said transit time.

4. Phase-modulation apparatus which comprises an elongated body of semiconductive material, means for injecting charges into said body at one region adjacent one end thereof, a circuit including a connection to said body at another region adjacent the other end thereof, means for establishing an electric field longitudinally of said body between said regions to determine the transit time of charges from said one region to said other region, a periodic wave source connected to said injection means, a signal source, and means under control of the signals of said source for varying said field, whereby waves appear in said circuit whose periodicity is that of the wave source but whose phase is modulated in accordance with the signal.

5. Frequency-modulation apparatus which comprises an amplifier having an elongated member, an input electrode at one end of said member, an output electrode at the other end of said member, said amplifier being characterized by a substantial transit time for an electrical disturbance originating at said input electrode to reach said output electrode, a feedback path coupling said output electrode to said input electrode, whereby a disturbance is recirculated around the loop comprising said elongated member and said feedback path at a frequency determined in part by said transit time, a source of signals, and means under control of said source for varying said transit time, thereby to modulate said recirculation frequency.

6. Frequency-modulation apparatus which comprises an elongated body of semiconductor material, an electrode ohmically connected to said body at each end thereof, an emitter engaging said body adjacent one end thereof, a collector engaging said body adjacent the other end thereof, an external circuit including a potential source connected to said ohmic electrodes, thereby to establish an electric field lengthwise of said body, whereby a wave of charges injected into said body at said emitter flows to said collector and gives rise, after a delay determined by the spacing of said collector from said emitter and by the strength of said field, to a delayed, amplified counterpart of said wave, a path coupling said collector to said emitter for feeding waves appearing at said collector back to said emitter, a wave-shaping element in said feedback path for standardizing waves so fed back, a signal source, and means controlled by said source for modifying said delay-determining field-strength.

7. Frequency-modulation apparatus which comprises an amplifier having an elongated body of semiconductive material, an emitter engaging one end thereof, a collector engaging the other end thereof, and means for causing a disturbance originating at said emitter to migrate to said collector, said amplifier being characterized by a substantial transit time for said migration, a feedback path coupling said collector to said emitter, a trigger circuit in said feedback path, adapted to deliver a pulse to the emitter when, and only when, it is actuated by a pulse from the collector, whereby a disturbance is recirculated around the loop comprising said elongated member and said feedback path at a frequency determined in part by said transit time, a source of signals, and means under control of said source for varying said transit time, thereby to modulate said recirculation frequency.

8. Frequency-modulation apparatus which comprises an amplifier having an elongated body of semiconductive material, an emitter engaging one end thereof, a collector engaging the other end thereof, and means for causing a disturbance originating at said emitter to migrate to said collector, said amplifier being characterized by a substantial transit time for said migration, a feedback path coupling said collector to said emitter, a trigger circuit in said feedback path adapted to deliver a pulse to the emitter when, and only when, it is actuated by a pulse from the collector, and means for supplying an initial pulse to the emitter, whereby a disturbance, once initiated, is recirculated around the loop comprising said elongated member and said feedback path at a frequency determined in part by said transit time, a source of signals, and means under control of said source for varying said transit time, thereby to modulate said recirculation frequency.

9. Signal translating apparatus which comprises an elongated semiconductive body, an input circuit including a rectifying connection to said body at one region adjacent one end thereof, an output circuit including a connection to said body at a second region adjacent the other end thereof, means for producing in said body and longitudinally thereof between said one region and said second region an electric field of polarity to transport charges introduced at said rectifying connection toward said second region, and means for varying said field to alter the speed of said transport.

10. Signal translating apparatus which comprises an elongated semiconductive body, an input circuit including a rectifying connection to said body at one region adjacent one end thereof, an output circuit including a connection to said body at a second region adjacent the other end thereof, means for producing in said body and longitudinally thereof between said one region and said second region an electric field of polarity to transport charges introduced at said rectifying connection toward said second region, the transit of said charges occupying a time which is dependent on the spacing between said regions and the strength of said field, and means for varying the strength of said field to alter said transit time.

11. Signal translating apparatus which comprises an elongated semiconductive body, an input circuit including a rectifying connection to said body at one region adjacent one end thereof, an output circuit including a connection to said body at a second region adjacent the other end thereof, means for producing in said body and longitudinally thereof between said one region and said second region an electric field of polarity to transport charges introduced at said rectifying connection toward said second region, the transit of said charges occupying a time which is dependent on the spacing of said regions and the strength of said field, a periodic wave source connected to supply wave energy to said input circuit, a source of signals, and means controlled by said signal source for varying the strength of said field to alter said transit time, whereby wave energy in said output circuit is phase-modulated in accordance with said signals.

12. Signal translating apparatus which comprises an elongated semiconductive body, an input circuit including a rectifying connection to said body at one region adjacent one end thereof, an output circuit including a connection to said body at a second region adjacent the other end thereof, means for producing in said body and longitudinally thereof between said one region and said second region an electric field of polarity to transport charges introduced at said rectifying connection toward said second region, the transit of said charges occupying a time which is dependent on the spacing of said regions and the strength of said field, and means for feeding back a disturbance appearing in said output circuit to said input circuit to promote sustained oscillations of a frequency dependent on said transit time.

13. In combination with apparatus as defined in claim 12, a source of signals, and means controlled by said signal source for varying the strength of said field to alter said transit time, whereby wave energy in said output circuit is frequency-modulated in accordance with said signals.

14. Signal translating apparatus which comprises a body of semiconductive material, an emitter of charges into said body engaging said body at one region thereof, a collector of charges transported from said emitter engaging said body at another region thereof, an additional connection to said body at each of said regions, a potential source connected between said additional connections for establishing in and between said regions an electric field of polarity to transport charges introduced at said emitter toward said collector, the transit of said charges occupying a time which is dependent on the spacing between the emitter and the collector and the strength of the field, and means for varying the strength of said field to alter said transit time.

15. Signal translating apparatus which comprises a body of semiconductive material, an emitter of charges into said body engaging said body at one region thereof, a collector of charges transported from said emitter engaging said body at another region thereof, an additional connection to said body at each of said regions, a potential source connected between said additional connections for establishing in and between said regions an electric field of polarity to transport charges introduced at said emitter toward said collector, the transit of said charges occupying a time which is dependent on the spacing between the emitter and the collector and the strength of the field, a periodic wave source connected to supply wave energy to said emitter, a source of signals, and means controlled by said signal source for varying the strength of said field to alter said transit time, whereby wave energy recovered from said collector is phase-modulated in accordance with said signals.

16. Signal translating apparatus which comprises a body of semiconductive material, an emitter of charges into said body engaging said body at one region thereof, a collector of charges transported from said emitter engaging said body at another region thereof, an additional connection to said body at each of said regions, a potential source connected between said additional connections for establishing in and between said regions an electric field of polarity to transport charges introduced at said emitter toward said collector, the transit of said charges occupying a time which is dependent on the spacing between the emitter and the collector and the strength of said field, and means for feeding back charges recovered from the collector to the emitter to promote sustained oscillations of a frequency dependent on said transit time.

17. In combination with apparatus as defined in claim 16, a source of signals, and means controlled by said signal source for varying the strength of said field to alter said transit time, whereby wave energy in said output circuit is frequency-modulated in accordance with said signals.

WINSTON E. KOCK.

REFERENCES CITED

The following references are of record in the file of this patent:

UNITED STATES PATENTS

| Number | Name | Date |
|---|---|---|
| 2,407,293 | Shepherd | Sept. 10, 1946 |
| 2,410,076 | Johnson | Oct. 29, 1946 |
| 2,456,026 | Shenk et al. | Dec. 14, 1948 |
| 2,476,323 | Rack | July 19, 1949 |
| 2,486,776 | Barney | Nov. 1, 1949 |
| 2,548,449 | Staub | Apr. 10, 1951 |
| 2,551,348 | Sunstein | May 1, 1951 |
| 2,562,792 | James | July 31, 1951 |
| 2,569,347 | Shockley | Sept. 25, 1951 |